Figure 1:
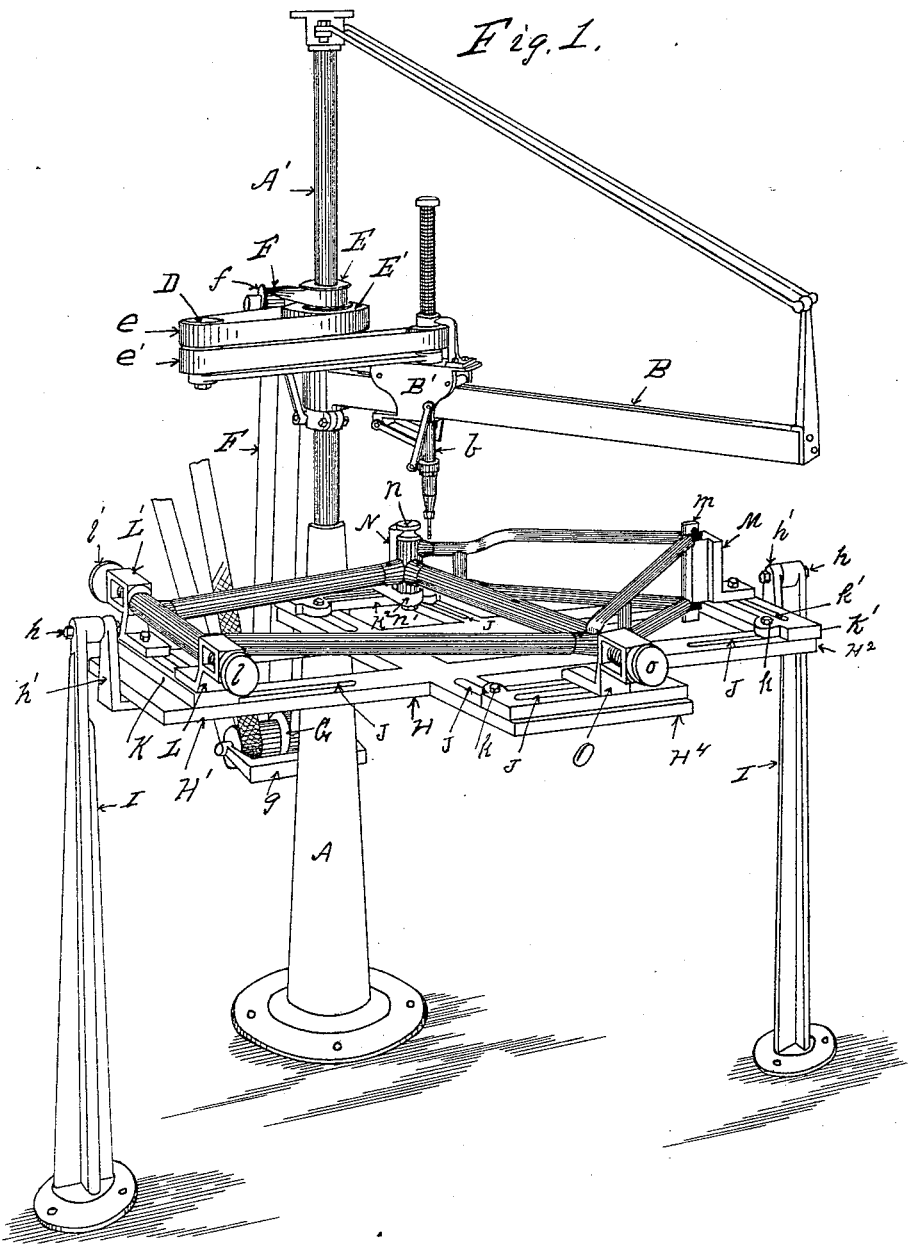

(No Model.) 2 Sheets—Sheet 1.

H. KELLER.
MACHINE FOR SETTING UP, DRILLING, AND PINNING BICYCLE FRAMES.

No. 602,623. Patented Apr. 19, 1898.

WITNESSES:
A. L. Jackson
F. J. Bassett

INVENTOR
Henry Keller
BY
ATTORNEY (No Model.) 2 Sheets—Sheet 2.

H. KELLER.
MACHINE FOR SETTING UP, DRILLING, AND PINNING BICYCLE FRAMES.

No. 602,623. Patented Apr. 19, 1898.

WITNESSES:
A. L. Jackson
F. J. Bassett

INVENTOR
Henry Keller
BY J. C. Sturgeon
ATTORNEY

UNITED STATES PATENT OFFICE.

HENRY KELLER, OF ERIE, PENNSYLVANIA, ASSIGNOR OF ONE-HALF TO WILLIAM B. FLICKINGER, OF SAME PLACE.

MACHINE FOR SETTING UP, DRILLING, AND PINNING BICYCLE-FRAMES.

SPECIFICATION forming part of Letters Patent No. 602,623, dated April 19, 1898.

Application filed July 21, 1897. Serial No. 645,324. (No model.)

*To all whom it may concern:*

Be it known that I, HENRY KELLER, a citizen of the United States, residing at the city of Erie, in the county of Erie and State of Pennsylvania, have invented certain new and useful Improvements in Machines for Setting Up, Drilling, and Pinning Bicycle-Frames; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to machines for setting up, drilling, and pinning bicycle-frames; and it consists, substantially, of the combination in one machine of a drill-press mechanism and a skeleton table mounted upon trunnions, so that it can be turned over, and provided with clamping mechanism adapted to be so adjusted thereon that any sized or shaped bicycle-frame can be clamped therein and firmly held until it is drilled and pinned together ready for brazing. This work has heretofore been done by clamping the frame into a suitable portable jig and then holding it upon the table of a drill-press and moving it about thereon until the necessary holes were drilled therein and then removing the jig with the frame therein from the drill-press table and pinning it together.

In the machine I have invented I dispense entirely with the ordinary portable jig and make a drill-press table in such shape that it operates as a bicycle-frame jig which can be adjusted to fit any sized or shaped frame, and this table, being mounted upon trunnions, can be reversed, so as to allow the drill to operate on both sides of the frame, and to adapt the drill mechanism to be operated at any point on the frame desired it is mounted upon a radially-swinging arm adapted to swing over the entire table, and as the drill mechanism moves freely in and out on said arm all parts of a bicycle-frame clamped on said table can be readily reached and operated upon by said drill, and by swinging the drill-arm to one side the table with the frame thereon can be turned over on its trunnions bottom side up and the drill operated thereon through openings in the table for that purpose. These and other features of my invention are hereinafter more fully set forth and described, and illustrated in the accompanying drawings, in which—

Figure 2:
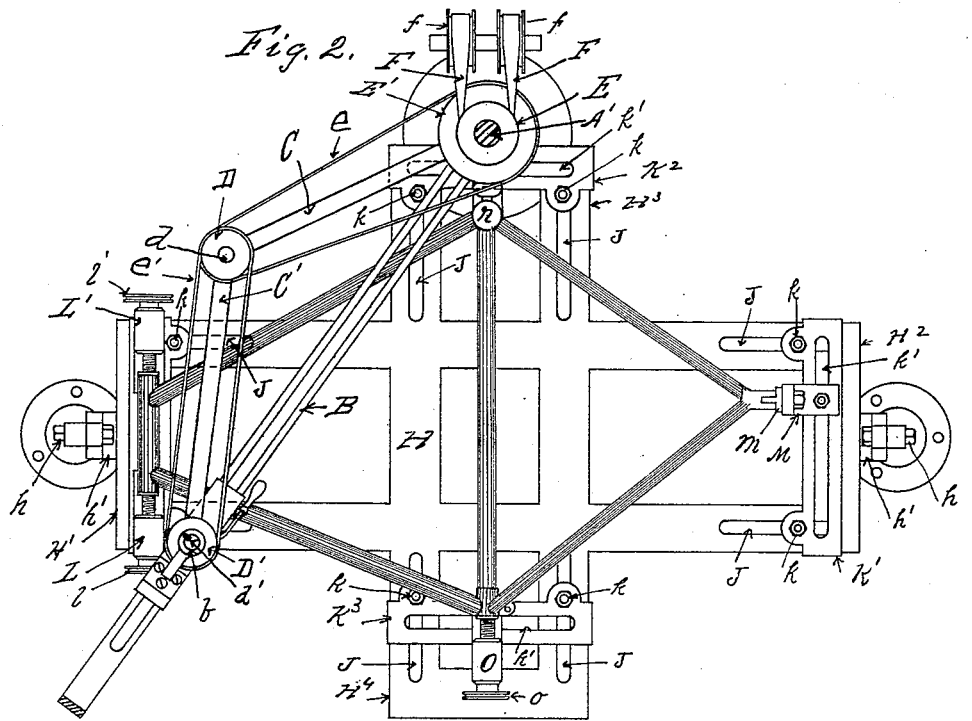
Figure 3:
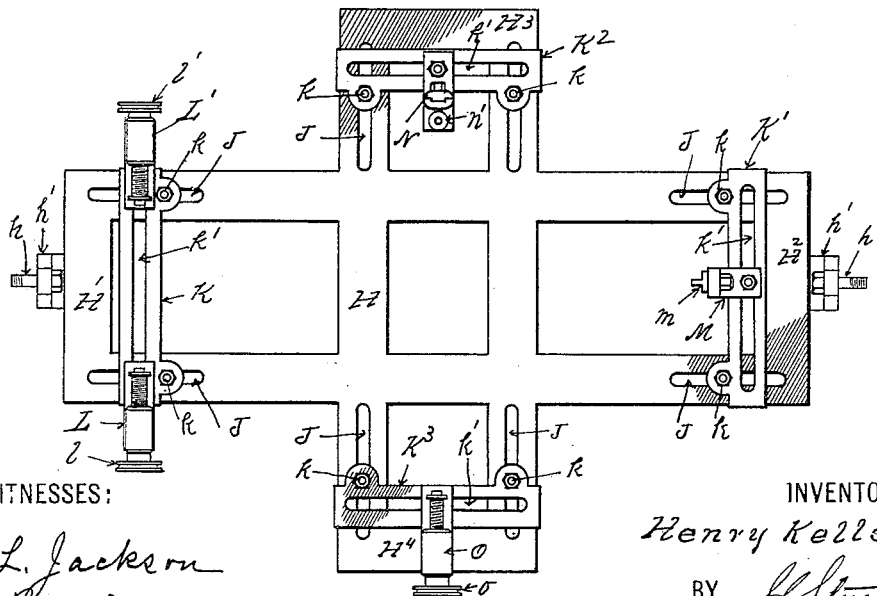

Figure 1 is a perspective view of a machine embodying my invention, showing a bicycle-frame clamped thereon. Fig. 2 is a top or plan view of the same. Fig. 3 is a top or plan view of the table portion of the machine, showing the adjusting and clamping mechanism thereon.

In the construction of my invention thus illustrated the drill-press portion thereof consists, substantially, of a standard A, secured to a suitable base, a column A', mounted in said standard A, a radially-swinging arm B, mounted on said column A', a frame B', adapted to be moved in and out on said arm and carrying a vertically-operating drill-stock $b$, a radially-swinging arm C, mounted on the column A' above the arm B, a like arm C', one end of which is pivoted to the end of the arm C and the other around the stem of the drill-stock $b$, and a double idler-pulley D, mounted on a bearing $d$, concentric with the pintle, pivoting the ends of the arms C and C' together. On the column A', just above the arm C, there is loosely mounted a double pulley E E', the pulley E receiving the driving-belt F, which passes down over idler-pulleys $f$ $f$ to and around a driving-pulley G, mounted in bearings $g$ on the back of the standard A, by means whereof the motive power is communicated to the pulley E', and thence by belt $e$ to the idler-pulley D, from whence power is communicated by means of a belt $e'$ to a pulley D', mounted on the stem of the drill-stock $b$ and connected therewith by means of a spline and groove $d'$, so that the stem of the drill-stock will move freely up and down therein.

In front of the standard A there is a table H, supported on trunnions $h$ $h$, mounted in posts I I. This table H is preferably made substantially in the shape of a Greek cross, the arms H' H² of this table, to which the trunnion-bearings are secured, being, however, slightly longer than the arms H³ and H⁴ thereof. These arms and the central part of the table are centrally cut away, so that when the table is turned over on its trunnions bottom side up, so as to drill joints on the opposite side of a bicycle-frame clamped thereon, the drill will pass through said openings, so that all necessary parts of the frame can be operated upon thereby.

The trunnions $h\ h$ are secured to arms $h'\ h'$, attached to the ends $H'$ and $H^2$, which arms extend sufficiently above the top of the table H that the trunnions $h\ h$ in the ends thereof are substantially on a level with a bicycle-frame clamped upon said table, so that when the table is reversed and turned over on its trunnions the bicycle-frame clamped thereon will be substantially the same distance below the drill as it is when the table H is right side up.

In each of the arms $H'$, $H^2$, $H^3$, and $H^4$ of the table H are cut longitudinal slots J J, and across the ends of these arms are secured transverse plates K, $K'$, $K^2$, and $K^3$ by means of bolts $k\ k$, passing therethrough and through the slots J J, whereby the plates K $K'$, &c., can be adjusted in and out as desired. These plates K, $K'$, $K^2$, and $K^3$ are provided with longitudinal slots $k'$, in which clamping mechanism is adjustably secured—viz., on the plate K are two clamp-screw heads L and $L'$, provided with clamping-screws $l$ and $l'$, adapted to engage the upper and lower ends of the steering-post of a bicycle-frame, as illustrated in Figs. 1 and 2. On the plate $K'$ is a clamping-head M, provided with a removable piece $m$, adapted to engage the forks at the rear of a bicycle-frame, as illustrated in Figs. 1 and 2. On the plate $K^2$ is a double clamping-head N, provided with a clamping-screw $n$ and bearing $n'$, adapted to engage the ends of the crank-shaft bearing of a bicycle-frame, as illustrated in Fig. 1, and on the plate $K^3$ is a clamping-head O, provided with a clamping-screw $o$, adapted to engage the upper end of the seat-post of a bicycle-frame, as illustrated in Figs. 1 and 2. All of these clamping-heads being adjustable in the slots $k'$ in said plates and the plates being adjustable on the table H, it is obvious that the plates and clamps can readily be adjusted to fit any sized and shaped bicycle-frame desired, which may be firmly clamped together and held while being drilled and pinned ready for brazing.

From the foregoing description the operation of this invention is so obvious that further description thereof is deemed unnecessary. Therefore

What I claim as new, and desire to secure by Letters Patent of the United States, is—

1. In a machine for setting up, drilling and pinning bicycle-frames, the combination of a radial drill mechanism, and a drill-table mounted upon trunnions secured to arms extending above the top of the table, plates adjustably mounted on the sides of said table, and clamping mechanism adjustably mounted on said plates, substantially as and for the purpose set forth.

2. In a machine for setting up, drilling and pinning bicycle-frames, the combination of a drilling mechanism, comprising, substantially, a radially-moving arm, a drill-head mounted upon said arm and adapted to move in and out thereon, and driving mechanism for operating a vertical drill-stock in said drill-head, and a table under said arm, vertical arms secured to said table and extending above the top thereof, trunnions secured to said arms for supporting said table, plates adjustably mounted on the sides of said table, and clamping mechanism adjustably mounted on said plates, substantially as and for the purpose set forth.

3. In a machine for setting up, drilling and pinning bicycle-frames, a table, vertical arms secured thereto and extending above the top of the table, trunnions on the ends of said arms, upon which the table is supported and adapted to be reversed, adjustable plates on said table, clamping mechanism adjustable on said plates and adapted to engage and clamp a bicycle-frame between them, substantially as and for the purpose set forth.

4. In a machine for setting up, drilling and pinning bicycle-frames, a cross-shaped skeleton table, a plate adjustably mounted on each side or arm of said table, clamp mechanism adjustably mounted on each of said plates adapted to clamp a bicycle-frame between them, and trunnions on two opposite sides or arms of said table, whereby it is supported and upon which it can be rotated, substantially as and for the purpose set forth.

5. In a machine for setting up, drilling and pinning bicycle-frames, a drill-press mechanism comprising substantially a drill-press standard and column A $A'$, a radially-moving arm B mounted on the column $A'$, a drill-head $B'$ carrying a vertically-operating drill-stock $b$ mounted upon and adapted to be moved in and out on the arm B, belt mechanism F $e$ and $e'$ for driving said drill-stock B, a cross-shaped table H under said radially-movable arm and mounted on trunnions $h\ h$ so as to be reversible, slots J J in the arms of said table, longitudinally-slotted plates K $K'$ $K^2$ and $K^3$ adjustably secured to the arms of said table by bolts passing through the slots J J therein, and clamping mechanism secured and adjustable in the longitudinal slots in said plates, substantially as and for the purpose set forth.

In testimony whereof I affix my signature in presence of two witnesses.

HENRY KELLER.

Witnesses:
W. B. FLICKINGER,
FRED EINFELDT.